Figure 5:
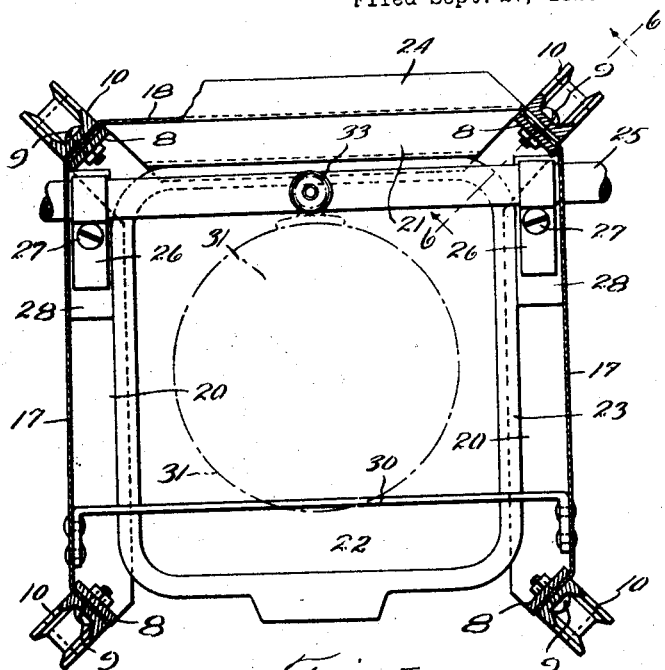

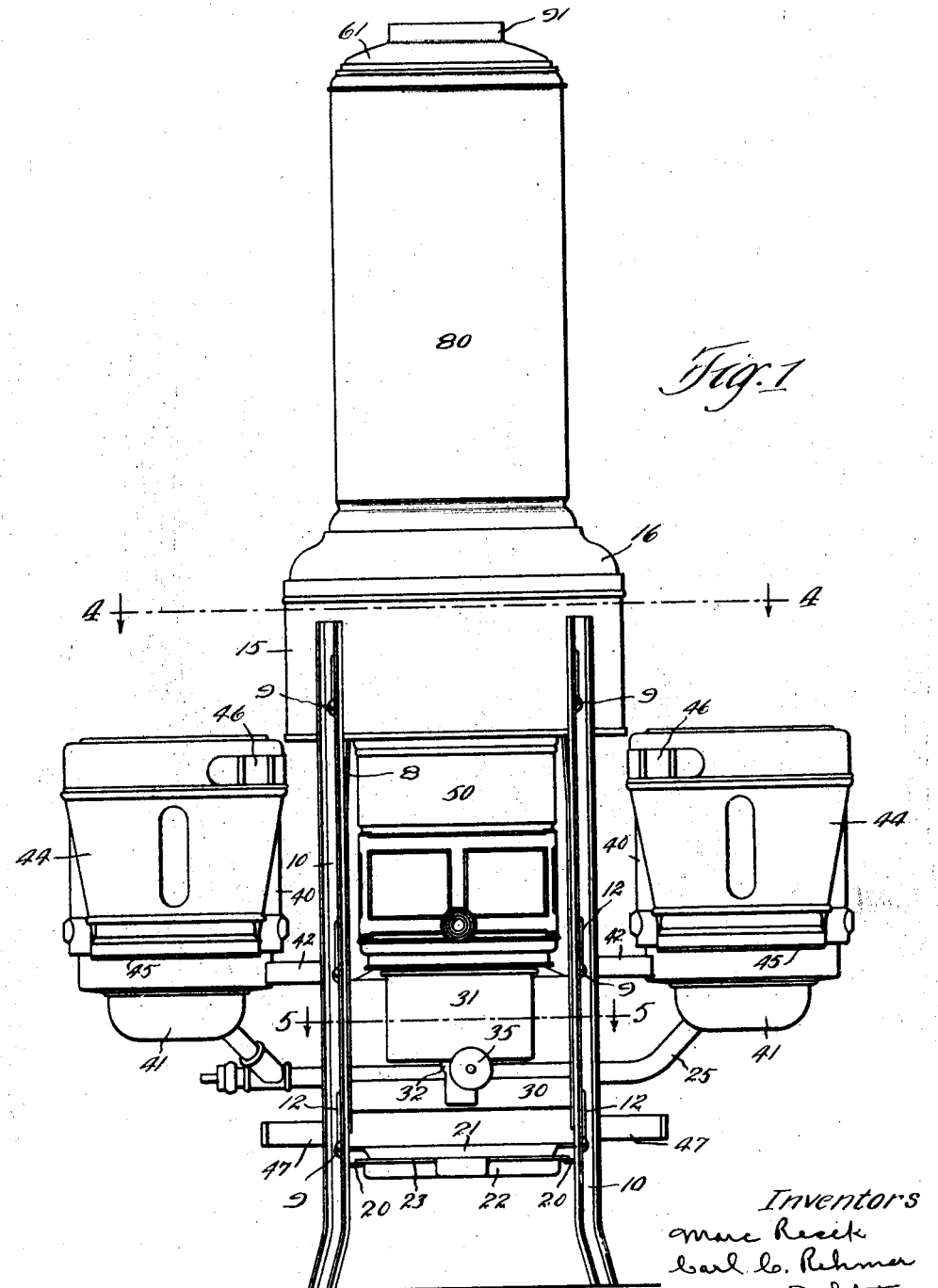

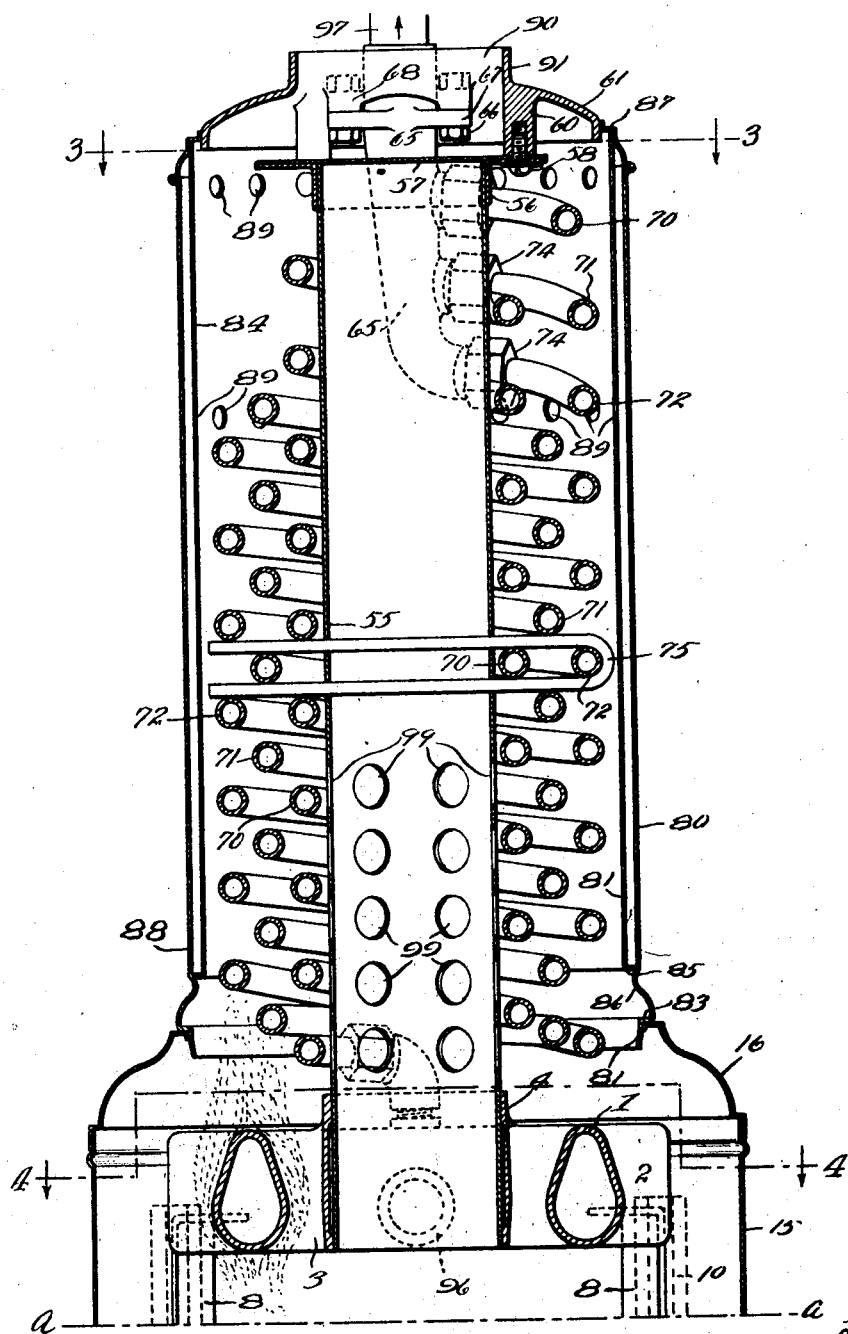

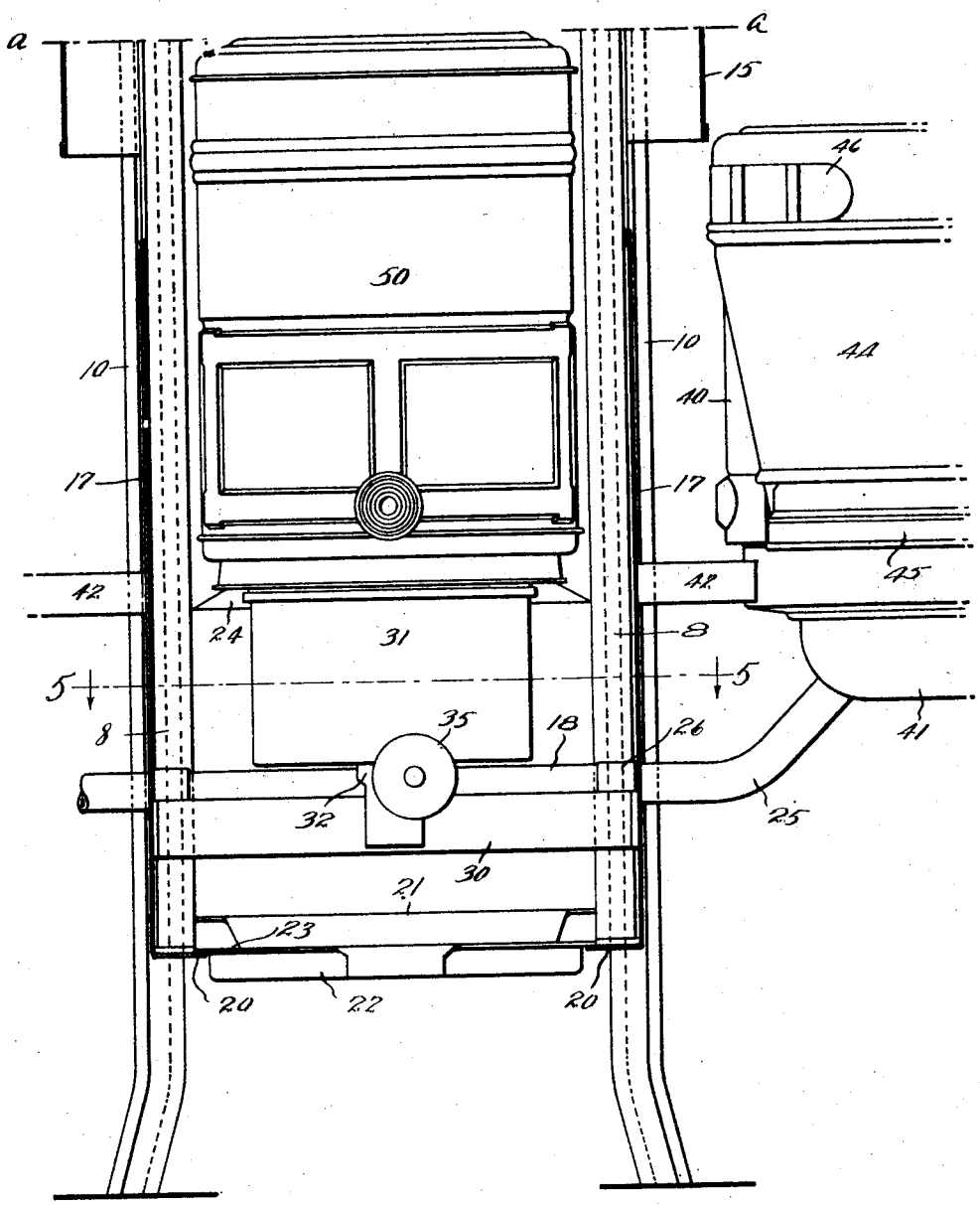

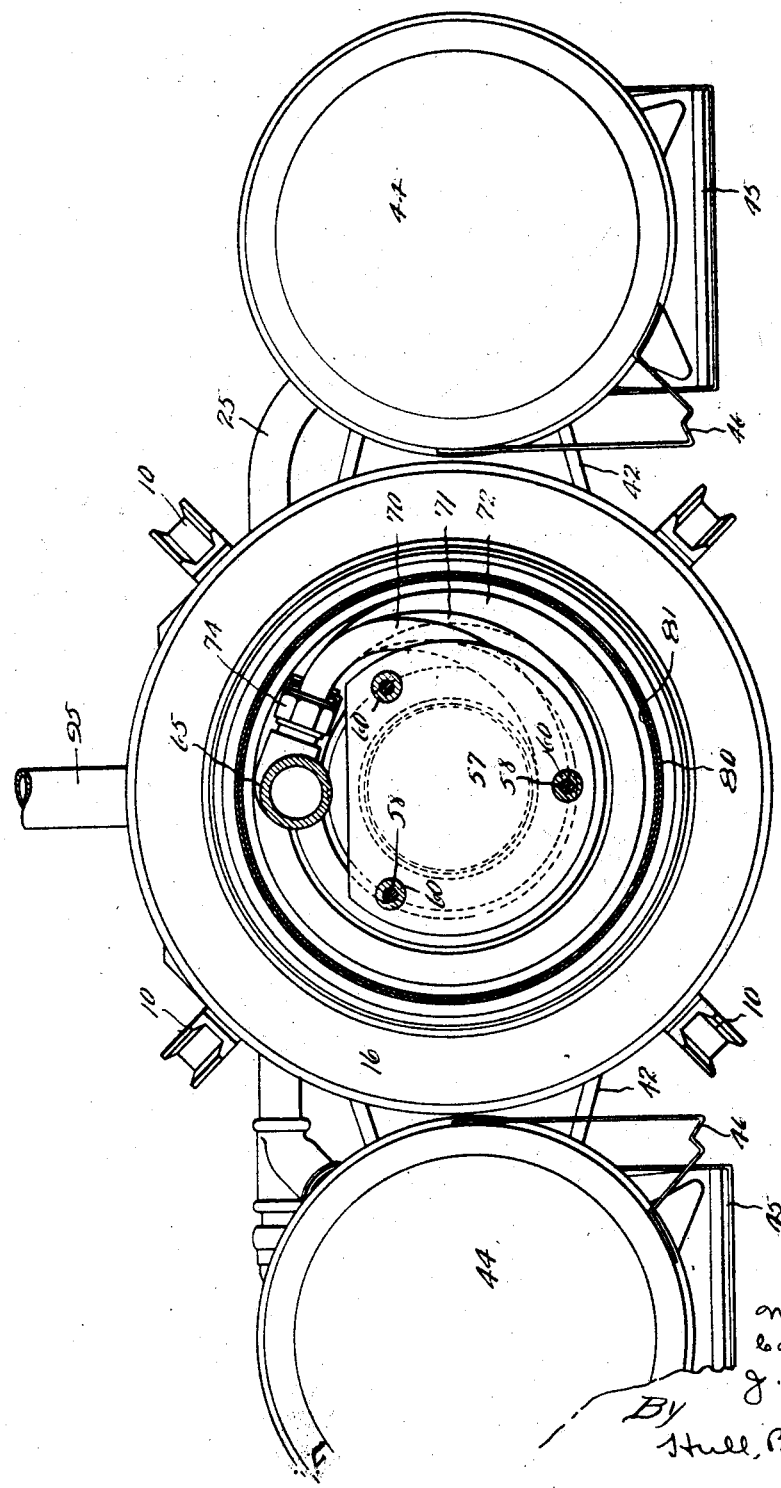

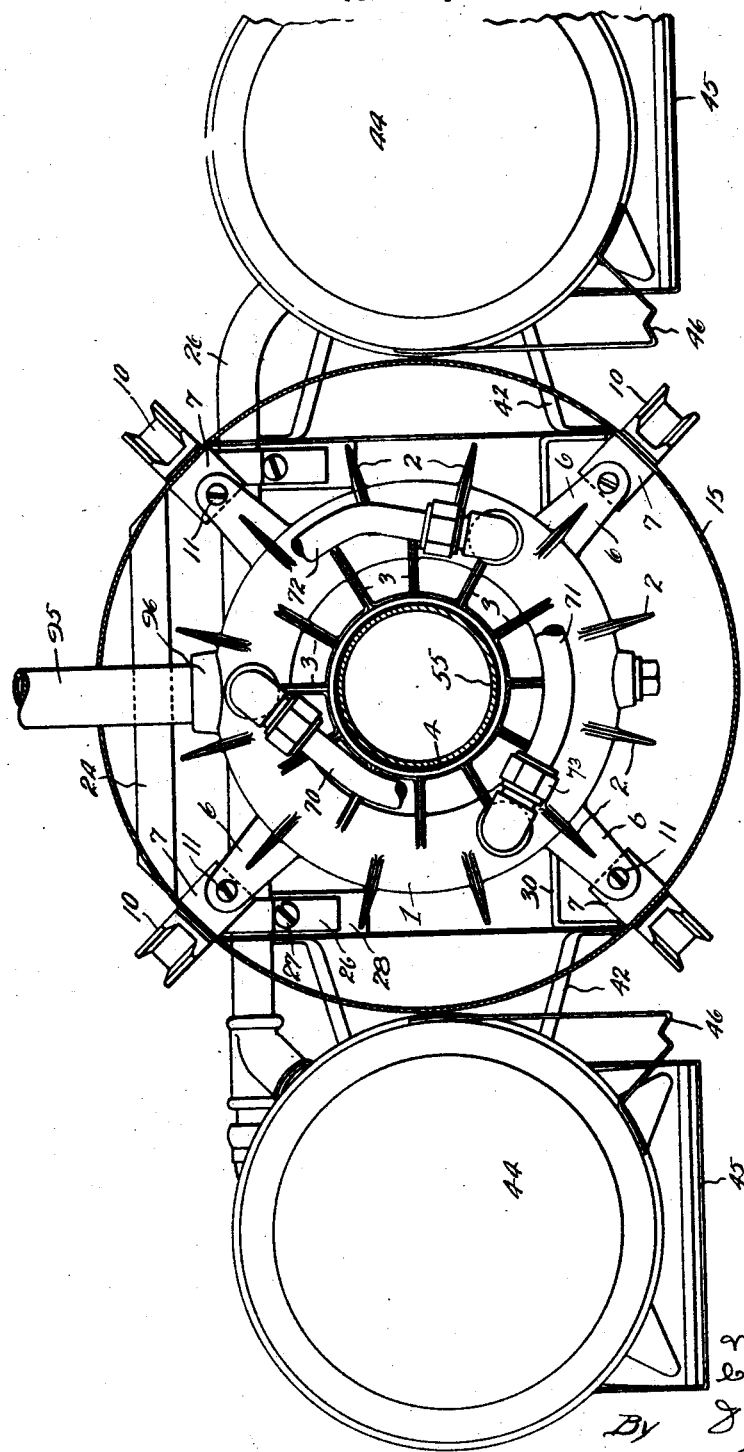

Feb. 26, 1929.  
M. RESEK ET AL  
1,703,173  
WATER HEATING APPARATUS  
Filed Sept. 27, 1923  
6 Sheets-Sheet 6

Inventors  
Marc Resek  
Carl C. Rehmer  
J. Alger Dahlstrom  
By Hull, Brock & West  
Attys.

Patented Feb. 26, 1929.

1,703,173

UNITED STATES PATENT OFFICE.

MARC RESEK, OF EAST CLEVELAND, CARL C. REHMER, OF CLEVELAND, AND J. ALGER DAHLSTROM, OF EAST CLEVELAND, OHIO, ASSIGNORS TO PERFECTION STOVE COMPANY, OF CLEVELAND, OHIO, A CORPORATION OF OHIO.

WATER-HEATING APPARATUS.

Application filed September 27, 1923. Serial No. 665,244.

This invention relates to water heaters and more particularly to the class wherein liquid fuel burners are employed; and it has for its general objects to provide a water heater of extremely high thermal efficiency; to provide a water heater of the coil type that is compact and very rigid and is practically indestructible; to provide a water heater of the aforesaid class that requires little attention; is easy to take care of, wherein both the burner and the water circulating unit are readily accessible for the purpose of cleaning, that is self-contained, comprising, as it does, a base incorporating a burner and fuel supply, and a water circulating unit supported in operative relation to the burner, all of which are secured together so that the assembly may be conveniently transported from place to place as a single structure with assurance that all parts will be maintained in proper relation to each other; to provide the base of the structure with legs which may be adjusted to compensate for irregularities in the floor or other supporting surface whereon the apparatus stands as well as to adapt it to slight differences in pipe lengths when the apparatus is being installed thereby to avoid such extreme accuracy in pipe fitting as would otherwise be necessary; and to provide a water heater of the foregoing character that is particularly convenient of assembly and installation.

To the attainment of these ends, with other and more specific objects which will hereinafter appear, our invention in its present preferred form may be defined briefly as consisting of a stand or base incorporating a burner and liquid fuel supply means in communicative connection with the burner and to which base or stand is secured, directly above the burner, a water receiving manifold from which a tubular column rises that is surrounded by a plurality of coils which have connection at their lower ends with said inlet manifold and at their upper ends with an outlet manifold that is secured to a cap, rigidly connected to the upper end of the column; and a suitable casing surrounds the water receiving manifold and is permanently carried by the stand or base and supports a removable drum which is preferably constructed with a double wall and which extends from said casing to the cap and encloses the coils.

Such a structure is illustrated in the accompanying drawings and while we shall proceed to describe the same specifically, it will be understood that we do not limit ourselves to the structural details thereof further than is required by the terms of the claims annexed hereto.

Figure 6:
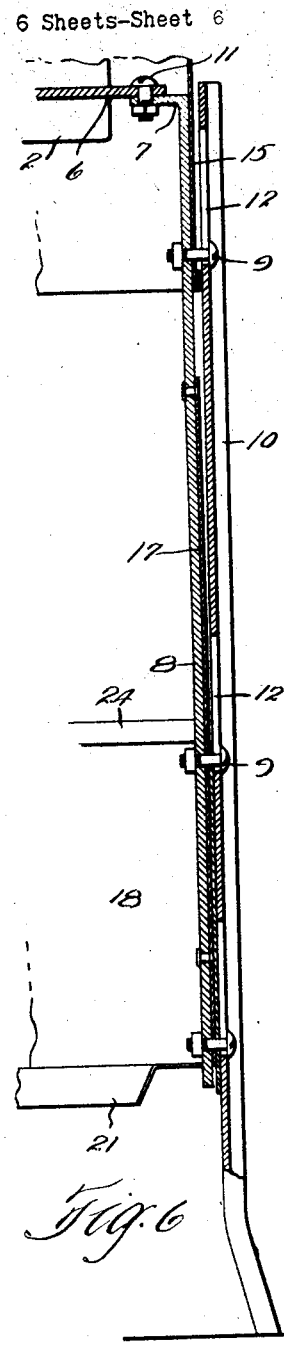
Figure 7:
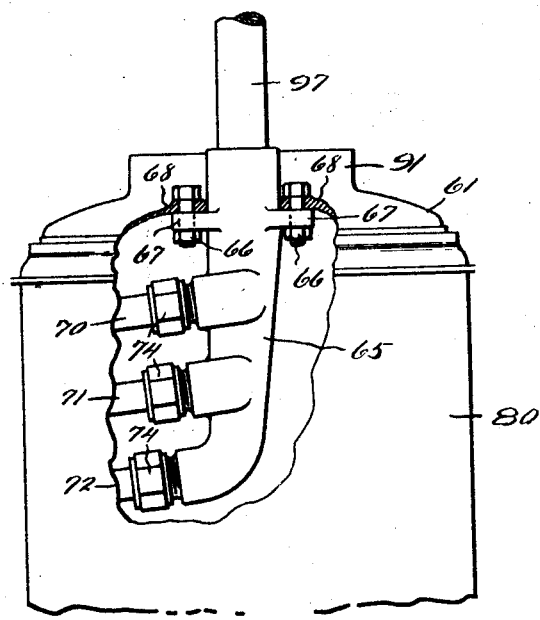

In the drawings, Fig. 1 is a front elevation of our improved water heater; Figs. 2 and 2ª (on the respective sheets 2 and 3), when matched on the lines a—a, constitute a central vertical section through the apparatus in a plane parallel to that of Fig. 1; Fig. 3 is a horizontal section through the upper end of the apparatus as indicated by the line 3—3 of Fig. 2; Fig. 4 is a section substantially on the lines 4—4 of Figs. 1 and 2; Fig. 5 is a horizontal section through the stand or base, as indicated by the lines 5—5 of Figs. 1 and 2ª, the position of the burner being indicated by dot-and-dash lines; Fig. 6 is a vertical section through one of the legs of the base or stand, as indicated by the line 6—6 of Fig. 5; and Fig. 7 is a fragmentary rear elevation of the heater, showing the casing or drum broken away to reveal the connection of the water circulating coils with the outlet manifold.

Proceeding now with a detailed description of the invention by the use of reference characters, 1 designates a water receiving unit or manifold which is in the form of a hollow annulus having radially disposed outwardly extending heat abstracting fins 2, and similar inwardly extending fins 3, the latter connecting at their inner ends with an integral ring 4. The unit or manifold 1 is shown as provided with four horizontally disposed ears 6 which extend outwardly and bear upon the inturned upper ends 7 of metal straps 8 which are secured by bolts 9 to the inner sides of legs 10. The ears 6 are shown as secured to the ends 7 of the straps 8 by bolts 11. The legs 10 are of channel formation, and the bolts 9 extend through slots 12 therein so that the legs may be individually adjusted to compensate for irregularities in the floor or other supporting surface whereon the apparatus stands, as well as to enable the entire structure to be raised and lowered within a reasonable range of adjustment to adapt it during installation to uncertain pipe lengths.

The skirt 15 of an annular shell 16 is clamped between the upper ends of the straps 8 and legs 10, and the bolts 9 which connect together the upper ends of the straps and legs pass through apertures in the skirt. As will be seen best from Fig. 5, side panels 17 have their forward edge portions clamped between the straps 8 and legs 10 occurring at the front of the base or stand, and their rear edge portions clamped between the corresponding elements occurring at the rear of the base or stand; and the side edges of a short rear panel 18 are also clamped between the last mentioned elements, certain of the bolts 9 passing through the edge portions of the panels to lock them in place. The side panels 17 terminate at their upper ends a suitable distance below the plane of the lower end of the skirt 15 and have their lower edges turned inwardly to provide flanges 20. The rear panel 18 is formed adjacent its lower edge to effect an abutment 21 in the plane of flanges 20. A suitable trap 22 is adapted to be supported, through its ledges 23, from the flanges 20 whereon it is properly positioned by engagement at its rear edge with the abutment 21. The top edge of the rear panel 18 is deflected rearwardly at a suitable angle to form a rest 24 for the burner drum, as shall presently appear. A fuel supply pipe 25 extends through apertures in the side panels 17, located near their lower rear corners, and the pipe is secured to said panels by suitable clamps 26 that are connected by bolts 27 to ledges 28 that extend inwardly from said panels. Supported by and between the front portions of the side panels 17 in substantially the horizontal plane of the pipe 25 is a bar 30. A liquid fuel burner 31 is supported at its front side from the bar 30 through a suitable leg 32, and at its rear side from the fuel supply pipe by an elbow fitting 33 through which the burner is communicatively connected to said pipe. The present burner is of the well-known tubular type and is equipped with a wick that may be raised and lowered by means of the wick raising spindle 35.

A fuel tank or reservoir 40 is shown as situated on each side of the stand or base. The reservoirs are of the well known gravity-feed liquid seal type. Each is adapted to be inverted over a fuel distributing receptacle which may contain sufficient fuel to cover the mouth or discharge opening of the reservoir and thus prevent the flow of additional fuel from the reservoir until the supply within the distributing receptacle is so depleted as to momentarily drop below the mouth of the reservoir. The distributing receptacle associated with each of the reservoirs is designated 41 and it has connection with the adjacent end of the fuel supply pipe 25. To assist the supply pipe in supporting the distributing receptacles and reservoirs, brackets 42 are provided which rigidly connect the upper ends of the distributing receptacles to the adjacent panels 17. Although it constitutes no part of our present invention, it may be explained in passing that the reservoirs 40 are contained in carriers 44 which are hingedly connected at 45 to the distributing receptacles 41 and may be swung from the position shown in the drawings to an inverted position in front of the distributing receptacles, thereby to swing the reservoirs to an upright position. The carriers 40 are sustained in proper inverted position by the engagement of brackets 46, which are carried by their free ends, with stops 47 which are secured to the lower ends of the side panels 17 and extend outwardly and forwardly therefrom.

Returning to the burner 31, the same is provided with a flue or drum 50 which is supported above the burner in such manner as to be capable of being swung rearwardly to expose the top of the burner for the purposes of lighting, cleaning and removing the wick, the drum when tilted rearwardly bearing upon the rest 24 provided by the rearwardly turned upper edge portion of the rear panel 18. The nature of the connection between the flue or drum 50 and the burner 31 forms no part of the present invention and therefore it is deemed unnecessary to specifically describe it in this connection although it may be generally related that the connection is such that the drum may be lifted from the burner or, when resting upon the burner and assuming as it does a hinge connection therewith, tilted rearwardly to bear upon the rest 24 as above described. For a more detailed explanation of this feature, reference may be had to the copending application of Lee S. Chadwick, Serial No. 539,079, filed February 25, 1922.

Fitted within and fastened to the ring 4 of the water receiving unit or manifold 1 is the lower end of a tubular column 55, and a flanged collar 56 is applied to its upper end. A plate 57, which rests upon the flange of the collar 56, closes the top of the column, and screws 58, which pass through registering apertures in the collar flange and the plates 57 are threaded into bosses 60 which depend from a cap 61.

A water outlet unit or manifold 65 has its upper end passed through an aperture in the cap 61 and is rigidly secured to the cap by bolts 66 which pass through ears 67 of said unit or manifold and through hollow bosses 68 of the cap. Three coiled tubes, preferably copper, encircle the column 55 and establish communication between the water receiving unit or manifold 1 and the outlet unit or manifold 65. The coiled tubes are designated 70, 71 and 72, and their lower ends are shown as connected, as by unions 73, to outlet connections of the unit or manifold 1, while their upper ends are connected, as by unions 74, with inlet connections of the unit or manifold 65. Attention is called particularly to the arrangement of the coils. In Fig. 2 it will be observed that tube 70 is adjacent the column 55 and a tube 72 is spaced a material distance therefrom but the convolutions of the latter tube are in substantially the plane of the corresponding convolutions of the tube 70. The convolutions of the tube 71 are staggered with respect to those of the former tubes being substantially midway between them in both vertical and horizontal directions. The tubes are naturally somewhat resilient and to assist in maintaining them in the relation described we utilize a staple 75 of comparatively stiff wire the branches whereof pass through diametrically opposite pairs of holes in the column 55 and at one end embrace portions of the tubes 70 and 72, and at the other a portion of the tube 71. This staple forms a support for the central portion of all of the tubes and at their ends the tubes are held rigid by their connection with the respective units or manifolds 1 and 65.

A cylindrical drum 80 encloses the coiled tubes and its somewhat contracted lower end 81 fits within the upper end of the base shell 16, while its upper end is contracted and fits about the edge portion of the cap 61. The drum is supported by a shoulder 83 which rests upon the shell 16. The drum 80 is preferably of double wall construction, the inner wall being designated 84. The lower end of the inner wall is flanged outwardly, as indicated at 85, and rests upon an inwardly directed bead 86 of the drum and its upper end fits within a contracted collar 87 that is attached to the top of the drum, as by a seam 87ª. Air is admitted to the space between the inner and outer walls through apertures 88 adjacent the lower end of the drum and escapes into the interior of the drum adjacent its upper end through holes 89 that are formed in the inner wall 84. The cap 61 is provided with a vent opening 90 shown as surrounded by a collar 91 to which a suitable flue may be connected if desired. A water inlet pipe 95 is extended through an aperture in the skirt 15 of the base shell 16 and is threaded into a boss 96 of the water receiving unit or manifold 1; and an outlet pipe 97 is threaded into the upper end of the outlet unit or manifold 65.

When the burner is lighted, a part of the products of combustion rise up and about the hollow annulus of the receiving unit or manifold 1 and the remainder pass upward into the column 55. Much of the heat of the products which pass about the annulus of the unit or manifold 1 is transmitted through the wall thereof to the water contained within the annulus, and to said wall through the heat abstracting fins 2 and 3, and raise the temperature of the water within the manifold or unit. The products continuing upward impinge against the coiled tubes 70, 71 and 72 and said tubes, arranged as hereinbefore described, constitute baffles which cause the products to progress upwardly through a tortuous course so that their ascent will be prolonged sufficiently to enable them to expend the maximum of their thermal value in heating the water within the tubes. The products which pass directly into the column 55 escape through apertures 99 that are situated near the lower end of the column and join those which pass upwardly about the annular portion of the unit or manifold 1, thus raising the temperature within the upper portion of the drum and consequently increasing the efficiency of the apparatus. The reason for locating the apertures 99 near the lower end of the column 55 is to preserve the products of higher thermal value which rise directly within the column for heating the upper ends of the tubes 70, 71 and 72 as otherwise the upper ends of said tubes would be deprived of products of very high temperature due to the fact that much of the heat is abstracted from the products as they pass about the water inlet manifold.

Also, the gases within the upper end of the drum are protected from the cooling influences of the surrounding outside air by the body of comparatively warm air passing upward through the space between the inner and outer walls of the drum, said air becoming heated by radiation from the inner wall 84, especially the lower end thereof. Air rising about the burner drum 50 and heated by radiation therefrom is caught by the shell 15 and conducted to the interior of the drum 80.

From the foregoing description it will be seen that our invention provides a highly efficient water heater, the construction whereof is very rigid, it being noted that the unit or manifold 1 is securely fastened to the supporting legs 10; that the column 55, which is surmounted by the cap 61, is fixed to the unit or manifold 1; that the coiled tubes are firmly secured at both ends by solderless joints in the nature of clamping unions to the substantial structure made up of the unit or manifold 1, column 55, cap 61 and unit or manifold 65; and that the burner and fuel supply means are incorporated in a very substantial manner within the base or stand.

In installing the apparatus, the legs 10 may be adjusted vertically to compensate for any unevenness of the floor or slight differences in pipe lengths so that when installed all parts may be relieved of strains and the apparatus supported firmly upon the legs. To light the burner, or to clean or remove the wick, it is only necessary to tilt the drum or flue 50 rearwardly when the wick will be exposed; and to clean the water circulating tubes, the drum 80 may be lifted above the cap 61.

By having two reservoirs 40, not only may the apparatus be kept supplied with an ample amount of fuel at all times, but one of the reservoirs will empty before the other starts to discharge owing to the obvious fact that a very slight difference in the elevation of the two reservoirs would cause the discharge mouth of one of them to remain covered by the quantity of fuel in the corresponding distributing receptacle until the supply in the other reservoir was entirely exhausted, so that when one of the reservoirs has emptied it may be refilled or replaced by a full reservoir at the convenience of the user, and during the time that it is empty or while it is being refilled or changed the other reservoir will supply fuel to the burner.

Another feature to which attention is especially directed is the so-called stream-line design of the water receiving manifold or unit 1. It will be observed that in cross-section it has a rounded bottom and upwardly converging side walls which come very close together at their upper ends. The products of combustion impinge against the bottom and sweep up along the side walls and come together thereabove, entirely enveloping the unit and avoiding a body of inactive air forming immediately above the unit as is the case with elements of prevailing cross-sectional shapes. The effect is suggested by the stippling in Fig. 2.

Having thus described our invention, what we claim is:—

1. In apparatus of the character set forth, the combination of a water receiving unit, a water outlet unit, means rigidly connecting together and spacing apart said receiving and outlet units, a coiled tube encircling said means and establishing communication between said units, and means connecting a portion of the coiled tube intermediate its ends to the former means thereby to impart stability to the tube.

2. In apparatus of the character set forth, the combination of a water receiving unit, a water outlet unit, means rigidly connecting together and spacing apart said receiving and outlet units, a plurality of coiled tubes encircling said means and establishing communication between said units, and means carried by the former means and engaging the coiled tubes intermediate their ends thereby to impart stability to the tubes and properly space them with respect to each other.

3. In apparatus of the character set forth, the combination of a water receiving unit, an open bottom hollow heat distributing column rising from the water receiving unit, said column having a closed top and perforations adjacent its lower end and into the open bottom of which a heating device is adapted to discharge its heat, a water outlet unit fixed to the top of said column, and a coiled tube encircling said column and establishing communication between the receiving and outlet units.

4. In apparatus of the character set forth, the combination of a water receiving unit, a hollow column, open at the bottom and closed at the top with apertures along the lower half, rising from the water receiving unit, said column adapted to be positioned over a burner, a water outlet unit fixed to the top of said column, and a coiled tube encircling said column and establishing communication between the receiving and outlet units and along which tube the products of combustion from the burner are distributed by said column.

5. In apparatus of the character set forth, the combination of a water receiving unit, a hollow column open at the bottom and supported by and rising from the receiving unit and into which a part of the products of combustion from a burner are adapted to be discharged, a cap closing the upper end of said column, a water outlet unit fixed to said cap, and a coiled tube encircling said column and establishing communication between the receiving and outlet units, the column having perforations for the distribution of the products to the coiled tube.

6. In apparatus of the character set forth, the combination of a water receiving unit, a column supported by and rising from the receiving unit, a cap surmounting said column, a water outlet unit fixed to said cap, a coiled tube encircling said column and establishing communications between the receiving and outlet units, and a casing enclosing the coiled tube and cooperating at its upper end with said cap.

7. In apparatus of the character set forth, the combination of a water receiving unit, a column rising from said receiving unit, a cap surmounting said column, a water outlet unit fixed to the cap, a coiled tube encircling the column and connected at its opposite ends to and establishing communication between said units, a shell enclosing the water receiving unit and fixed with respect thereto, and a drum enclosing the coil, said drum resting at its lower end upon the shell and cooperating at its upper end with said cap.

8. In apparatus of the character set forth, the combination of a water receiving unit, a tubular column rising from the water receiving unit and opening below the same, the upper end of the column being closed, a cap supported by and above and in spaced relation to the upper end of the column, said column having openings adjacent its lower end above the water receiving unit, an outlet unit secured to the cap, a coiled tube encircling the column and establishing communication between the receiving and outlet units, a shell surrounding the water receiving unit and fixed with respect thereto, and a drum enclosing the coil, said drum resting at its lower end upon the shell and cooperating at its upper end with said cap, the cap being provided with a vent opening.

9. In apparatus of the character set forth, the combination of a water receiving manifold having a central opening, a tubular column having its lower end fitted within said opening, the upper end of said column being closed, a cap supported by and above and in spaced relation to the upper end of the column, said cap having a vent opening, a water outlet manifold supported by the cap, a plurality of coiled tubes encircling the column and establishing communication between the receiving and outlet manifolds, the convolutions of said coiled tubes being arranged in staggered relation to each other and a casing enclosing said tubes and cooperating at its upper end with the aforesaid cap.

10. In apparatus of the character set forth, the combination of a water receiving manifold having a central opening, a tubular column supported by said manifold and having its lower end fitted within said opening, a cap supported by and above the upper end of the column, an outlet manifold secured to the cap, a plurality of coiled tubes encircling the column and establishing communication between the receiving and outlet manifolds, and a casing enclosing the tubes and manifolds and cooperating at its upper end with the aforesaid cap.

11. In apparatus of the character set forth, the combination of a water receiving unit, legs supporting said unit, two at each side thereof, a side panel extending between and supported by each pair of side legs, a fuel supply pipe extending through apertures in the side panels, a fuel reservoir supported from and adjacent the outer side of one of the side panels and having communicative connection with the said pipe, and a liquid fuel burner situated between the side panels and having connection with the supply pipe.

12. In apparatus of the character set forth, the combination of a water receiving unit, legs supporting said unit, two at each side thereof, each leg comprising an inner member to the upper end of which said unit is secured, and an outer member connected to the former member for longitudinal adjustment with respect thereto, a shell enclosing the water receiving unit and having a skirt engaged between the inner and outer members of the legs, a side panel extending between and supported by each pair of side legs, a rear panel supported by and between the rear legs, a fuel supply pipe extending through apertures in the side panels, a fuel reservoir supported from and adjacent the outer side of one of the side panels and having communicative connection with said pipe, and a liquid fuel burner situated between the side panels and having connection with the supply pipe.

In testimony whereof, we hereunto affix our signatures.

MARC RESEK.
CARL C. REHMER.
J. ALGER DAHLSTROM.